(12) United States Patent
Teranishi (10) Patent No.: US 11,336,584 B2
(45) Date of Patent: May 17, 2022

(54) COMMUNICATION CONTROL DEVICE THAT VARIES DATA PARTITIONS BASED ON A STATUS OF CONNECTED NODES

(71) Applicant: FUJI CORPORATION, Chiryu (JP)

(72) Inventor: Yosuke Teranishi, Inazawa (JP)

(73) Assignee: FUJI CORPORATION, Chiryu (JP)

(*) Notice: Subject to any disclaimer, the term of this patent is extended or adjusted under 35 U.S.C. 154(b) by 351 days.

(21) Appl. No.: 16/466,493

(22) PCT Filed: Dec. 7, 2016

(86) PCT No.: PCT/JP2016/086325
§ 371 (c)(1),
(2) Date: Jun. 4, 2019

(87) PCT Pub. No.: WO2018/105047
PCT Pub. Date: Jun. 14, 2018

(65) Prior Publication Data
US 2021/0266267 A1 Aug. 26, 2021

(51) Int. Cl.
| | |
|---|---|
| *H04L 12/911* | (2013.01) |
| *H04L 12/917* | (2013.01) |
| *H04L 47/78* | (2022.01) |
| *H04L 47/76* | (2022.01) |
| *H04L 12/40* | (2006.01) |
| *H04L 12/403* | (2006.01) |

(52) U.S. Cl.
CPC ............ *H04L 47/781* (2013.01); *H04L 47/76* (2013.01); *H04L 12/403* (2013.01); *H04L 12/40169* (2013.01); *H04L 2012/4026* (2013.01)

(58) Field of Classification Search
CPC ..... H04L 47/781; H04L 47/76; H04L 12/403; H04L 2012/4026; H04L 12/40169
See application file for complete search history.

(56) References Cited

U.S. PATENT DOCUMENTS

| | | | |
|---|---|---|---|
| 7,852,857 B2 | 12/2010 | Beckhoff et al. | |
| 2001/0023454 A1* | 9/2001 | Fitzgerald | H04L 47/12 709/233 |
| 2006/0212604 A1 | 9/2006 | Beckhoff et al. | |
| 2008/0002737 A1 | 1/2008 | Schwenkel et al. | |

(Continued)

FOREIGN PATENT DOCUMENTS

| | | |
|---|---|---|
| JP | 2008-526059 A | 7/2008 |
| JP | 2016-151851 A | 8/2016 |
| WO | WO 2013/184117 A1 | 12/2013 |

OTHER PUBLICATIONS

International Search Report dated Mar. 7, 2017 in PCT/JP2016/086325 filed Dec. 7, 2016.

(Continued)

*Primary Examiner* — Hoang-Chuong Q Vu
(74) *Attorney, Agent, or Firm* — Oblon, McClelland, Maier & Neustadt, L.L.P.

(57) ABSTRACT

A communication control device includes a frame configuration section configured to reconfigure a frame by changing a ratio of each of data partitions in a data field according to a communication state of a network including multiple nodes, and a process command section configured to instruct the multiple nodes to execute configuration process such that the multiple nodes are enabled to transmit and receive the reconfigured frame.

13 Claims, 6 Drawing Sheets

(56) References Cited

U.S. PATENT DOCUMENTS

| | | | |
|---|---|---|---|
| 2012/0327954 A1* | 12/2012 | Iourtchenko | H04L 65/607 |
| | | | 370/474 |
| 2013/0259050 A1* | 10/2013 | Eastlake, III | H04L 45/04 |
| | | | 370/392 |
| 2014/0198680 A1* | 7/2014 | Siomina | H04L 5/14 |
| | | | 370/252 |
| 2014/0341091 A1* | 11/2014 | Ji | H04L 5/1469 |
| | | | 370/280 |
| 2015/0156285 A1 | 6/2015 | Blair | |
| 2015/0173086 A1* | 6/2015 | Karaman | H04W 8/005 |
| | | | 370/254 |
| 2016/0240077 A1* | 8/2016 | Nagasaka | H04L 5/16 |
| 2017/0013565 A1* | 1/2017 | Pelletier | H04W 52/365 |
| 2017/0171096 A1* | 6/2017 | Bunte | H04L 47/801 |
| 2017/0289215 A1* | 10/2017 | Lundrigan | H04L 65/80 |

OTHER PUBLICATIONS

Extended European Search Report dated Nov. 25, 2019, in Patent Application No. 16923327.7, citing documents AA-AC and AO therein, 7 pages.

* cited by examiner

FIG.7

COMMUNICATION CONTROL DEVICE THAT VARIES DATA PARTITIONS BASED ON A STATUS OF CONNECTED NODES

TECHNICAL FIELD

The present application relates to a communication control device.

BACKGROUND ART

A communication control device controls communication of a network including multiple nodes. For example, Patent Literature 1 discloses a communication control device applied to a component mounting machine for mounting electronic components on a circuit board to produce a board product. The communication control device forms a network by using field devices such as a mounting head and a component supply device in the component mounting machine as nodes. The communication control device performs communication by transmitting and receiving a frame having a data field, for example, in accordance with a communication standard applied to communication in the network.

PATENT LITERATURE

Patent Literature 1: JP-A-2016-151851

BRIEF SUMMARY

Technical Problem

Depending on the communication standard applied to the network, a data partition of a specified capacity may be assigned to each of multiple nodes in the data field of the frame. In the communication using the frame, if the total sum of the specified capacities of the multiple nodes exceeds the capacity of the data field due to the addition or exchange of nodes in the network, the communication efficiency may be lowered. For this reason, the specified capacity for each of the multiple nodes is secured with the minimum capacity required for the function of the node, which may result in restriction in terms of maintaining the communication efficiency, for example. The present invention has been made in view of the above circumstances, and an object thereof is to provide a communication control device capable of improving communication efficiency.

Solution to Problem

The present specification discloses a communication control device for transmitting and receiving a frame having a data field to which data partitions of specified capacities for the respective multiple nodes in communication with the multiple nodes are assigned, the communication control device comprising: a frame configuration section for reconfiguring the frame by changing a ratio of each of the data partitions in the data field according to a communication state of a network including the multiple nodes; and a process command section for instructing the multiple nodes to execute a configuration process such that the multiple nodes are enabled to transmit and receive a reconfigured frame.

Advantageous Effects

With such a configuration, the communication control device reconfigures the frame in accordance with the communication state of the network, and executes the configuration process to enable communication using the frame. As a result, each of the multiple nodes transmits and receives a corresponding reconfigured frame. Therefore, since an appropriate data partition is assigned to each node according to the communication state of the network, it is possible to prevent a predetermined data partition from being reserved in the data field for a node having a low need for communication, and it is possible to secure an appropriate data partition for a node having a high need for communication. As a result, communication efficiency in the network can be improved.

DESCRIPTION OF EMBODIMENTS

1. Embodiment

An embodiment of the communication control device will be described below with reference to the drawings. A communication control device controls communication of a network including multiple nodes. In the present embodiment, a mode in which the communication control device is applied to a component mounting machine as a production device having multiple field devices will be described by way of example.

(1-1. Configuration of Component Mounting Machine 1)

Figure 1:
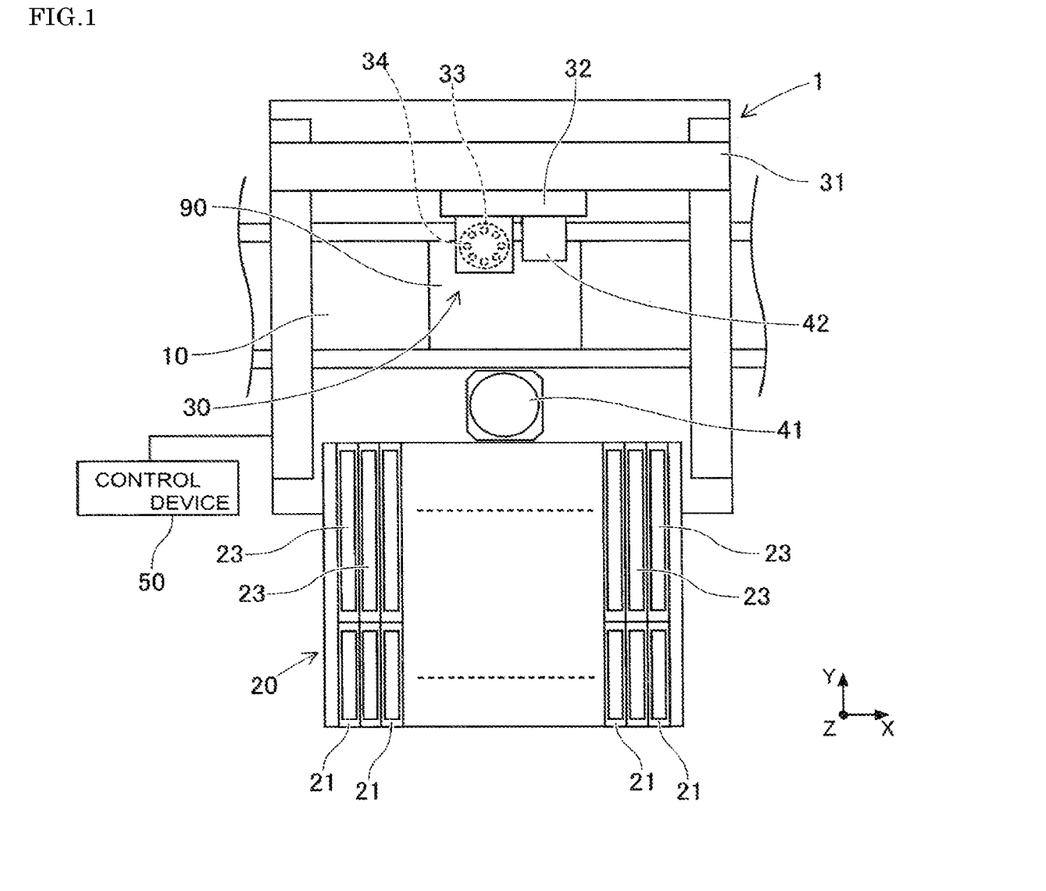
FIG. 1 is a schematic diagram showing a component mounting machine to which a communication control device according to an embodiment is applied.

Component mounting machine 1 is a production device for mounting electronic components on circuit board 90 to produce a board product. Multiple component mounting machines 1 are arranged in parallel in the conveyance direction of circuit board 90, for example, in the left-right direction in FIG. 1, and constitute a production line for producing a board product. As shown in FIG. 1, component mounting machine 1 includes board conveyance device 10, component supply device 20, component transfer device 30, part camera 41, board camera 42, and control device 50. In the following description, the horizontal width direction (left-right direction in FIG. 1) of component mounting machine 1 is taken as an X-axis direction, the horizontal depth direction (up-down direction in FIG. 1) of component mounting machine 1 is taken as a Y-axis direction, and the vertical direction (front-rear direction in FIG. 1) perpendicular to the X-axis and the Y-axis is taken as a Z-axis direction.

Board conveyance device 10 is configured by a belt conveyor or the like, and sequentially conveys circuit board 90 in the conveyance direction, that is, in the X-axis direction in the present embodiment. Board conveyance device 10 positions circuit board 90 at a predetermined position in the machine of component mounting machine 1. After a mounting process by component mounting machine 1 is performed, board conveyance device 10 conveys circuit board 90 to the outside of component mounting machine 1.

Component supply device 20 supplies electronic components to be mounted on circuit board 90. Component supply device 20 has multiple slots 21 arranged side by side in the X-axis direction. In each of the multiple slots 21, feeder 23 is set to be replaceable. Feeder 23 feeds and moves a carrier tape that accommodates a large number of electronic components and supplies the electronic components such that they can be picked up at a supply position located on the distal end side of feeder 23.

Component transfer device 30 includes head driving device 31, moving table 32, and mounting head 33. Head driving device 31 is configured such that moving table 32 can be moved in the X-axis direction and the Y-axis direction by a linear motion mechanism. Mounting head 33 is used for picking up and transferring the electronic components supplied from component supply device 20 to circuit board 90. Mounting head 33 is fixed to moving table 32 by a clamp (not shown).

Mounting head 33 has multiple suction nozzles 34 that are detachably provided. Mounting head 33 supports each suction nozzle 34 so as to be rotatable about an R-axis parallel to the Z-axis and so as to be able to be lifted and lowered. Suction nozzle 34 controls a lifting and lowering position, an angle, and a negative pressure supply state for mounting head 33. Suction nozzle 34 picks up an electronic component supplied by feeder 23 of component supply device 20 by supplying negative pressure.

Part camera 41 and board camera 42 are digital-type imaging devices having an imaging element such as a charge coupled device (CCD) and a complementary metal oxide semiconductor (CMOS). Part camera 41 and board camera 42 capture an image of a range that falls within the visual field of the camera based on a control signal from control device 50 connected so as to be able to communicate with each other, and transmit captured image data to control device 50.

Part camera 41 is fixed to the base of component mounting machine 1 such that the optical axis faces upward in the vertical direction (Z-axis direction). Part camera 41 is configured to be able to capture an image of an electronic component held by suction nozzle 34 of mounting head 33 from below component transfer device 30. Board camera 42 is provided on moving table 32 of component transfer device 30 such that the optical axis faces downward in the vertical direction (Z-axis direction). Board camera 42 is configured to be able to capture an image of circuit board 90.

Control device 50 mainly includes a CPU, various memories, and a control circuit. Control device 50 executes the mounting process for mounting an electronic component on circuit board 90. The mounting process is executed based on a control program and is a process in which electronic components supplied from component supply device 20 are picked up, and a pick-and-place cycle in which the electronic components are transferred to predetermined positions on the circuit board 90 is repeated multiple times.

In addition, in the mounting process, when the position of mounting head 33 and the operation of the suction mechanism are controlled, control device 50 inputs information output from various sensors provided in component mounting machine 1 and the result of the recognition process by image processing or the like. The control device then sends a control signal to component transfer device 30 based on the control program, information obtained by various sensors, and results of various recognition processes. Thus, the position and the rotation angle of suction nozzle 34 supported by mounting head 33 are controlled.

(1-2. Network 61 of Component Mounting Machine 1)

Network 61 of component mounting machine 1 will be described with reference to FIGS. 2 and 3. Control device 50 of component mounting machine 1 performs data transmission between field devices such as board conveyance device 10, component supply device 20, and component transfer device 30. Here, the "field device" is a device that processes data output from various sensors such as encoders and devices such as relay devices and performs a predetermined operation in production. Each of the field devices includes control device 50 and a communication device for communicating with other field devices.

Control device 50 includes communication control device 51 that transmits and receives frame 62 (see FIG. 3) in communication with multiple nodes, where multiple field devices are used as multiple nodes. More specifically, communication control device 51 performs communication with the communication devices of the individual nodes (field devices). Here, as network 61 of the component mounting machine 1, for example, an industrial Ethernet for performing various data transmission by communication using a communication system based on Ethernet (registered trademark) can be applied.

In the present embodiment, network 61 of component mounting machine 1 employs a master-slave system. Communication control device 51 is a master that performs communication with each of the multiple nodes as slaves in network 61 at regular intervals. Communication control device 51 as a master generally controls transmission of frame 62 transmitted and received to and from each slave. Each slave performs a predetermined operation in production based on various data included in frame 62.

Communication control device 51 inputs various data included in frame 62. Control device 50 of component mounting machine 1 determines the control content and the like in the mounting process based on the various data received. Thus, for example, through the communication control device 51, board conveyance device 10 is instructed to convey circuit board 90 or component transfer device 30 is instructed to transfer electronic components according to the control program. For this reason, particularly during the execution of the mounting process accompanied by the transfer of the electronic component as described above, an operation reflecting the current state acquired by the field device is necessary, and real-time capability is required in communication.

In component mounting machine 1, at least a part of nodes (field devices) incorporates updatable firmware. Specifically, the firmware is, for example, a program for controlling the supply of electronic components to the control section of feeder 23 of the component supply device 20. Feeder 23 executes firmware based on an externally input control signal, a set value stored in a memory, and the like. As a result, feeder 23 feeds and moves the carrier tape so as to pick up the electronic components. In addition, the firmware can be incorporated in the control section of mounting head 33 of the component transfer device 30 as a program for controlling the position in the Z-axis direction and the rotation angle of suction nozzle 34.

As described above, the firmware in the field device is incorporated in advance according to the required function, and the version of the firmware may need to be upgraded according to the addition of a new function or the like. In such a case, the communication control device 51 transmits a predetermined version of firmware to a specific field device. Therefore, when data necessary for updating the firmware is communicated as described above, an increase in the communication capacity for a specific field device is required.

Figure 3:
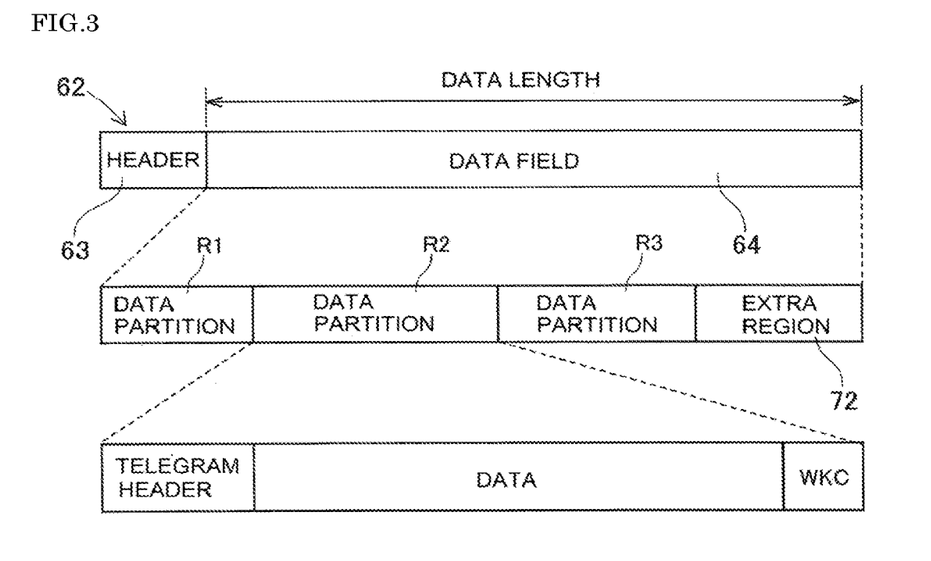
FIG. 3 is a diagram showing a form of frames transmitted and received in a network.

Here, frame 62 used for communication has header 63 and data field 64, as shown in the upper part of FIG. 3. When the communication in network 61 is based on Ethernet, frame 62 has a frame check sequence (FCS) (not shown) and constitutes an Ethernet frame. In this case, header 63 is composed of fields such as a destination address and a source address, and the field length is fixed. The field length of data field 64 is variable within a predetermined range or fixed to a predetermined value depending on a communication standard applied to network 61.

In the present embodiment, the data length of data field 64 is fixed to a predetermined value as shown in the middle part of FIG. 3. In data field 64, data partitions (R1, R2, and R3) having a predetermined capacity are assigned to each of multiple nodes. The individual specified capacities of data partitions (R1, R2, and R3) are set in advance in accordance with, for example, a required data communication capacity. Specifically, the specified capacities of data partitions (R1, R2, and R3) are set based on the number of signals corresponding to the number of sensors and relays included in a field device as a node and the capacity required for transmission of the instruction command.

As shown in the lower part of FIG. 3, the data partition in which the specified capacity is set as described above is composed of a telegram header, data, and a working counter. The header includes a data length corresponding to a specified capacity and an address of a node. The working counter is a check bit for verification. The specified capacity of each node is set from the minimum data capacity to the maximum data capacity in a range in which data field 64 having a fixed field length is accommodated.

Here, the "minimum data capacity" is the minimum capacity required for each of the multiple nodes to transmit and receive frame 62 and is the capacity corresponding to the telegram header, the data corresponding to the number of signals, and the working counter. Nodes of which specified capacity is set to be less than the minimum data capacity are substantially excluded from communication in network 61. The "maximum data capacity" is a capacity that a node can transmit and receive by one frame 62, and is set for each node depending on the specification of the communication device of the node. Specifically, in a predetermined communication standard, the capacity of a communication buffer included in the communication device of the node corresponds to the maximum data capacity.

(1-3. Detailed Configuration of Communication Control Device 51)

In communication with multiple nodes, communication control device 51 transmits and receives frame 62 having data field 64 to which data partitions of specified capacities are assigned to the respective multiple nodes as described above. In network 61 in which communication using frame 62 is performed, a configuration process is executed in the communication device of each node such that the multiple nodes are enabled to transmit and receive frame 62. As a result, each node defines a data partition assigned to itself in data field 64.

The configuration process is generally executed in each node when each node is communicably connected and network 61 is configured. In this case, the specified capacity of each data partition is appropriately set such that the sum does not exceed the capacity (field length) of data field 64 while securing the minimum data capacity for each node. However, when the communication state of the network changes, the required communication capacity changes for each node. On the other hand, communication control device 51 is capable of communication corresponding to change in the communication state to improve the communication efficiency.

Figure 2:
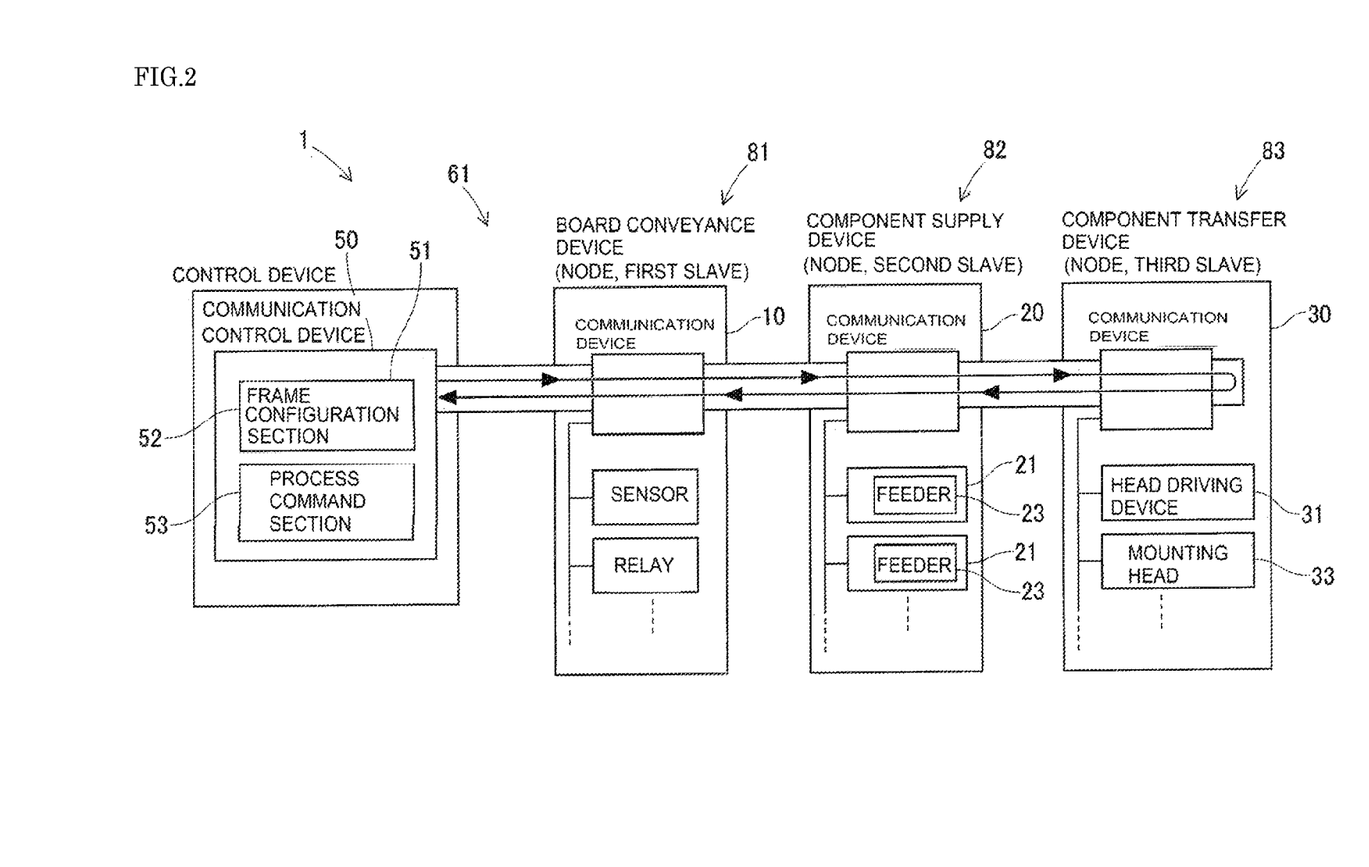
FIG. 2 is a block diagram showing a network of a component mounting machine.

As shown in FIG. 2, communication control device 51 includes frame configuration section 52 and process command section 53. Frame configuration section 52 reconfigures frame 62 by changing the ratio of each data partition in data field 64 according to the communication state of network 61 including multiple nodes. Here, the ratio of each data partition is the ratio of the specified capacity of each data partition defined by the execution of the previous configuration process.

For example, when the capacity of data field 64 is 100 bytes and three data partitions (R1, R2, and R3) are 20, 30, and 40 bytes, respectively, the ratio of each data partition is 2:3:4. In this example, the capacity of extra region 72 excluding three data partitions (R1, R2, and R3) from data field 64 is 10 bytes.

In addition, in the present embodiment, frame configuration section 52 reconfigures frame 62 by changing the ratio of each data partition by setting a partial region or the entire region of data field 64 as target field 71, and reallocating target field 71 to each of the multiple nodes. Frame configuration section 52 may take only a region of data field 64 or only the entire region of data field 64 as the target for redistribution, or may switch the regions as appropriate and take them as the target for redistribution. Also, in the region of data field 64, for example, above-mentioned extra region 72, a data partition assigned to a node that does not require communication, and the like, can be included.

In the present embodiment, when frame 62 is reconfigured during the production (mounting process) by the production device (component mounting machine 1), frame configuration section 52 sets extra region 72 excluding data partitions (R1, R2, and R3) of data field 64 as target field 71, and reallocates target field 71 for each of the multiple nodes, thereby changing the ratio of each data partition and reconfiguring frame 62.

That is, when component mounting machine 1 is executing the mounting process, a method of reallocating the extra region is adopted among various methods for changing the ratio of each data partition. In this manner, when the operation mode of component mounting machine 1 is a production mode, the capacities of data partitions (R1, R2, and R3) already allocated and assigned in frame 62 that is being currently used are maintained, and extra region 72 is reallocated to the multiple nodes. As a result, the specified capacities of data partitions (R1, R2, and R3) of the multiple nodes are increased only by the capacity to be reallocated, and the communication efficiency is improved.

Further, when the production device (component mounting machine 1) stops production (mounting process) and frame 62 is reconfigured during maintenance, frame configuration section 52 configures frame 62 by changing the ratio of each data partition by setting the entire region of data field 64 as target field 71, and reallocating target field 71 for each of the multiple nodes. For example, when firmware in a field device is updated, a method of reallocating entire data field 64 is adopted among various methods for changing the ratio of each data partition.

Thus, when the operation mode of component mounting machine 1 is a maintenance mode, the entire region of data field 64 is reallocated to multiple nodes without maintaining the capacities of data partitions (R1, R2, and R3) already allocated and assigned in frame 62 that is currently used. At this time, at least a minimum data capacity may be assigned to the multiple nodes, or a capacity less than the minimum data capacity (including zero) may be assigned to the multiple nodes. As a result, frame 62 corresponding to the communication capacity of each node required for the execution of the maintenance is reconfigured, and the communication efficiency is improved.

Also, when reallocating target field 71, various dividing methods can be employed depending on whether target field 71 is divided equally or at a specific ratio. Specifically, in the present embodiment, frame configuration section 52 divides target field 71 by any one of following dividing methods (A) to (C). Dividing method (A) divides target field 71 equally into multiple nodes. Therefore, frame configuration section 52 evenly reallocates target field 71 to each of the multiple nodes, thereby changing the ratio of each data partition to reconfigure frame 62.

In dividing method (B), the communication weight in network 61 is set in advance for each of the multiple nodes, and target field 71 is divided based on the proportion of the communication weight for each of the multiple nodes. Therefore, frame configuration section 52 reallocates divided target field 71 to each of the multiple nodes, thereby changing the ratio of each data partition to reconfigure frame 62.

The communication weight is proportional to the number of signals required depending on the function of the field device that is a node, for example, and the communication weight is set to increase as the number of signals, which depend on the number of sensors or relays, the capacity of commands input and output to and from the nodes, and the like are increased. In other words, dividing method (B) assigns a larger capacity to a node requiring a larger communication capacity.

In dividing method (C), frame configuration section 52 divides target field 71 based on the proportion of the communication deviation for each of the multiple nodes. The "communication deviation" is a difference between the maximum data capacity and the minimum data capacity, and indicates a deviation between the capacity (maximum data capacity) that the node can originally transmit through communication and the capacity (minimum data capacity) suppressed by the relationship between other nodes. Therefore, frame configuration section 52 reallocates the target field 71, which has been divided based on the proportion of the communication deviation, to each of the multiple nodes, thereby changing the ratio of each data partition and reconfiguring frame 62.

The communication deviation for each of the multiple nodes corresponds to an increased amount required from the minimum data capacity based on the amounts of signals required according to the function of each node (that is, the communication weight for each node). That is, while dividing method (B) uses the "communication weight" set by the administrator, the operator, or the like of the production line, in dividing method (C), target field 71 is divided using the communication deviation automatically determined by the communication specification of each node, and the larger the communication deviation, the larger the capacity assigned to the node.

Process command section 53 instructs the multiple nodes to execute the configuration process so that the multiple nodes are enabled to transmit and receive reconfigured frame 62. As a result, each node defines a data partition assigned to the node among data fields 64 in reconfigured frame 62.

(1-4. Reconfiguration Process of Frame 62)

The reconfiguration process of frame 62 by communication control device 51 will be described with reference to FIGS. 2 to 7. Hereinafter, in order to simplify the description, it is assumed that three field devices, that is, board conveyance device 10, component supply device 20, and component transfer device 30, are connected to network 61 in addition to communication control device 51, as shown in FIG. 2. The communication devices of the field devices are assumed to be first slave 81, second slave 82, and third slave 83 in the order in which frame 62 (see FIG. 3) transmitted from the master (communication control device 51) are transmitted.

In the present embodiment, the communication in network 61 is performed in a cycle in which frame 62 transmitted from the master (communication control device 51) passes through all the slaves (first slave 81 to third slave 83), and the frame transmitted back by the last slave (third slave 83) passes through all the slaves (third slave 83 to first slave 81) again and is returned to the master (communication control device 51).

Each slave (first slave 81, second slave 82, and third slave 83) reads and writes data from and to data partition (R1, R2, R3) assigned to the slave in data field 64 when frame 62 passes through the slave. That is, when the communication in network 61 is performed in a fixed cycle of, for example, 1 kHz, the process is executed every 1 ms in which frame 62 is transmitted from the master (communication control device 51), and data of frame 62 is read and written on the fly by each slave (first slave 81, second slave 82, and third slave 83) and is returned to the master (the communication control device 51) again.

Figure 4:
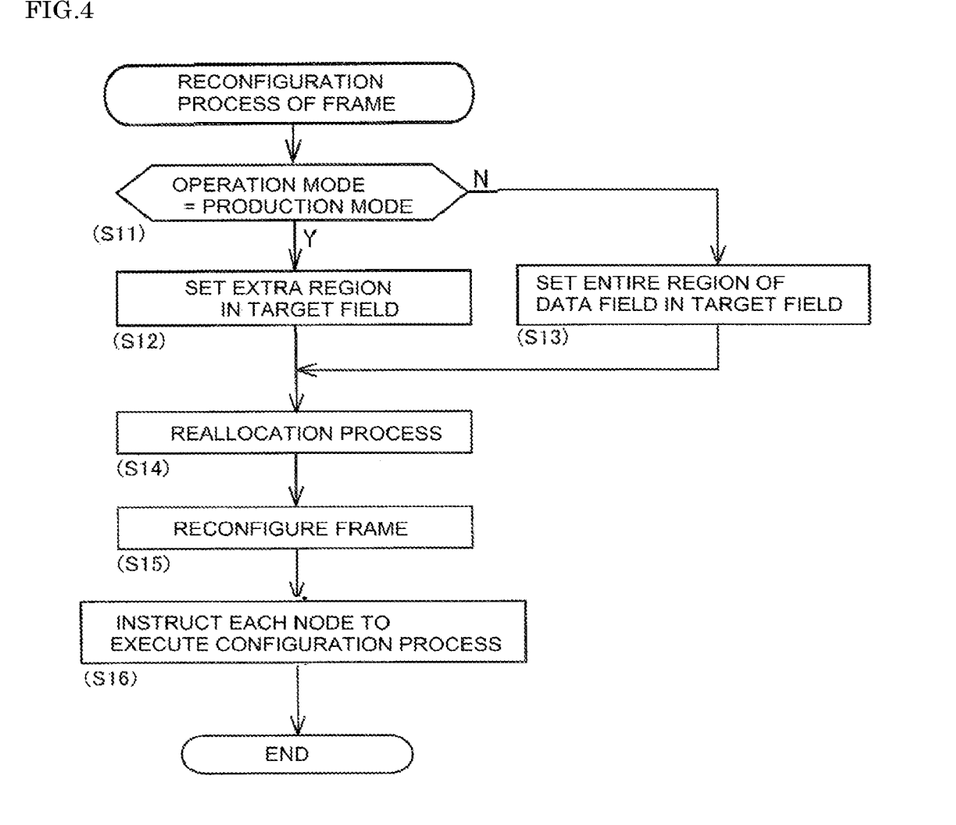
FIG. 4 is a flowchart showing a frame reconfiguration process.

For example, when there is a change in the communication state of network 61 or a request from an operator, communication control device 51 executes a reconfiguration process of frame 62 as shown in FIG. 4. Here, the change in the communication state of network 61 means that the operation mode of the component mounting machine 1 is switched or the operating ratio of each field device is changed even in the same operation mode, and the change of the communication capacity required in each node occurs above a predetermined level or the change of the communication capacity is predicted.

The "request from the operator" includes a request for optimization of frame 62 by an operator who operates component mounting machine 1, for example, to perform a subsequent operation or to adjust the operation mode of component mounting machine 1. Frame configuration section 52 first determines whether the operation mode of component mounting machine 1 is the production mode (Step 11 (hereinafter, Step is referred to as "S")). When the mounting process is being executed by component mounting machine 1 and the operation mode is the production mode (S11: Yes), frame configuration section 52 sets extra region 72 in target field 71 (S12).

On the other hand, when the mounting process by the component mounting machine 1 is stopped and the operation mode is other than the production mode (S11: No), frame configuration section 52 sets the entire region of data field 64 in target field 71 (S13). In order to simplify the description, it is assumed that an operation mode other than the production mode is the maintenance mode for executing the maintenance of component mounting machine 1. After target field 71 is set (S12, S13), frame configuration section 52 executes a reallocation process of reallocating target field 71 to each of the multiple nodes (S14).

Figure 5:
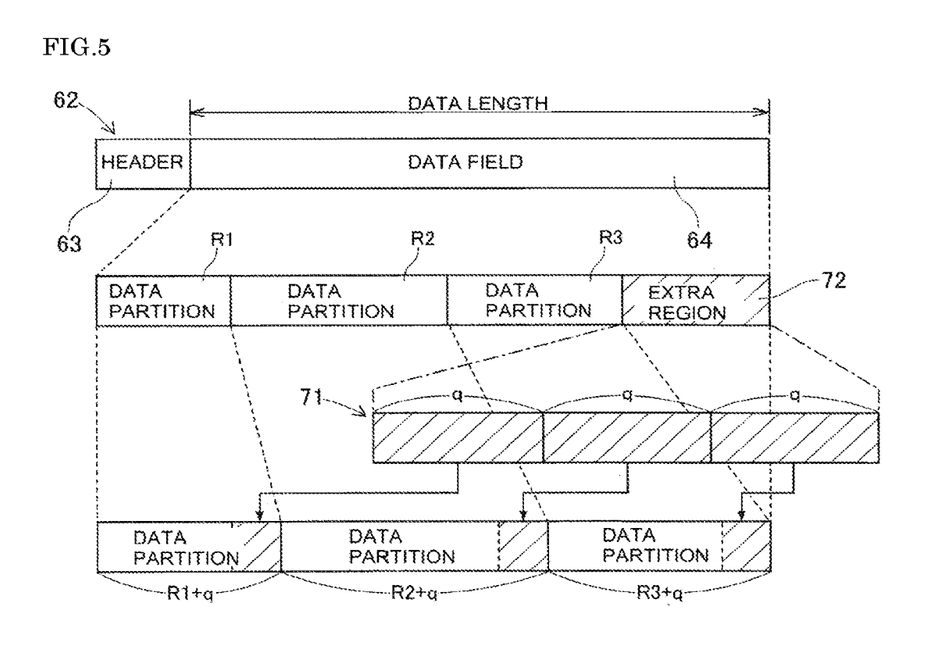
FIG. 5 is a diagram showing a frame in which a ratio of individual data partitions is changed by being evenly divided.

In reallocation process (S14), target field 71 is divided and reallocated by any one of above-described dividing methods (A) to (C). Specifically, assuming that target field 71 is extra region 72, in division method (A) for equally dividing, target field 71 is divided equally by the number of slaves (3 in the present embodiment), and is reallocated to first slave 81, second slave 82, and third slave 83, respectively, as shown in FIG. 5. Thus, the capacity of first slave 81 or the like adds an equal fraction (q) to the original data partition.

Figure 6:
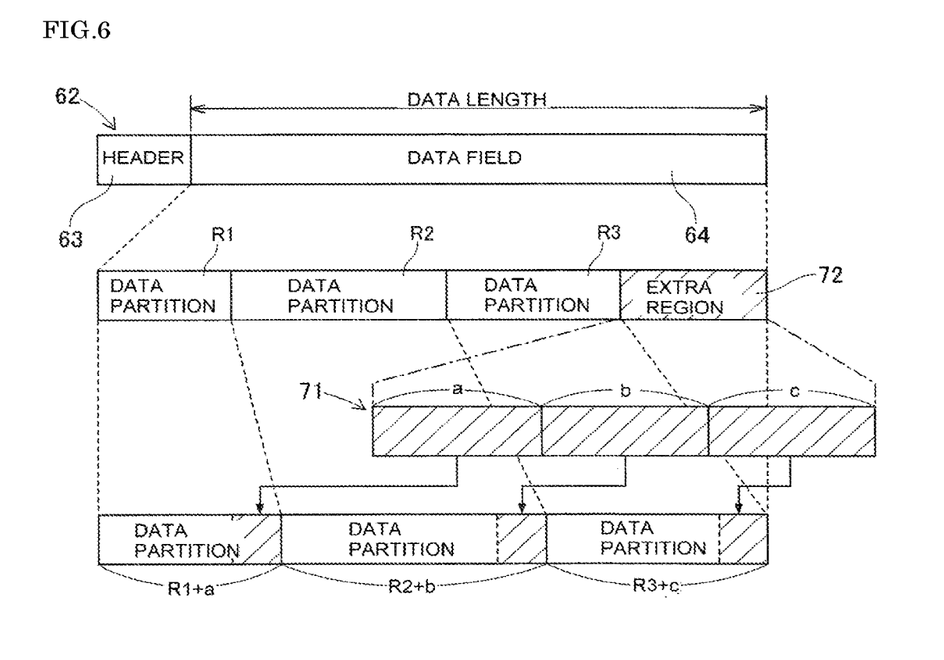
FIG. 6 is a diagram showing the frame in which the ratio of each of the data partitions is changed by a communication weight.

In division method (B) for dividing based on respective communication weights (a, b, c), as shown in FIG. 6, target field 71 is divided by the proportions (a:b:c) of the communication weights, and is reallocated to first slave 81, second slave 82, and third slave 83. Thus, the capacity of first slave 81 or the like adds the amount reallocated according to the communication weight to the original data partition.

Figure 7:
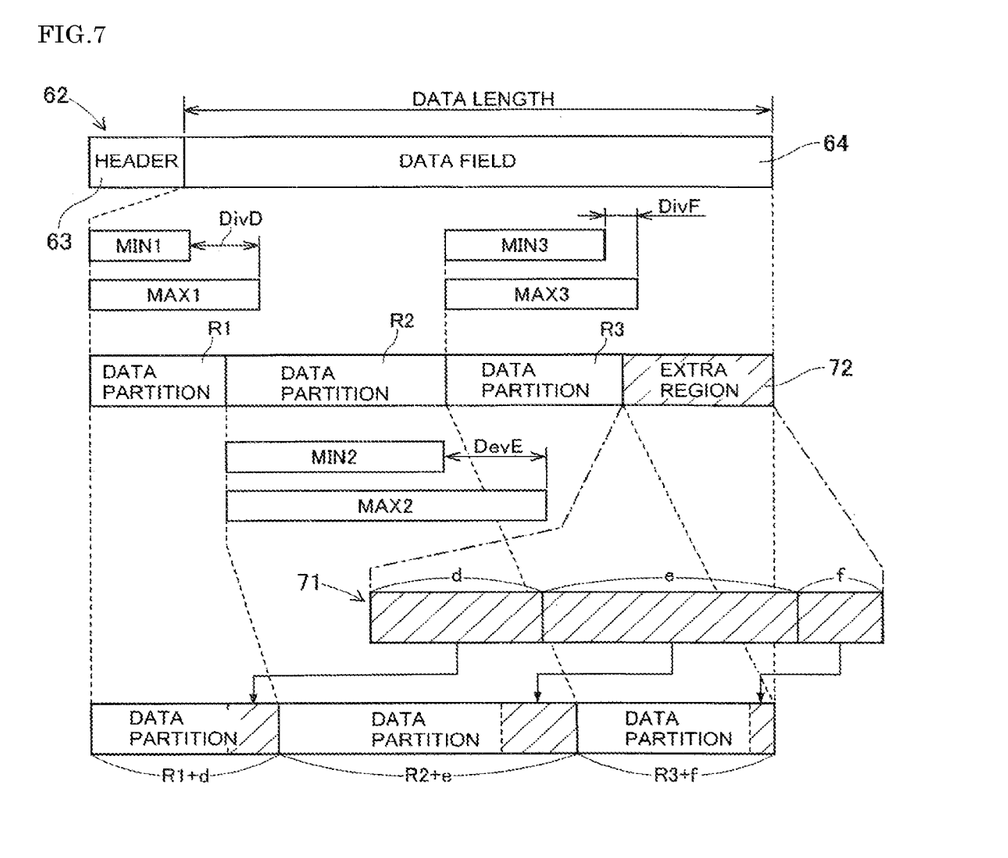
FIG. 7 is a diagram showing the frame in which the ratio of each of the data partitions is changed by communication deviation.

In dividing method (C) for dividing based on the respective communication deviations, as shown in FIG. 7, first, minimum data capacities (MIN1, MIN2, MIN3) are subtracted from maximum data capacities (MAX1, MAX2, MAX3), respectively, and communication deviations (DivD, DivE, DivF) are calculated for each of the multiple nodes. Then, communication deviations (DivD, DivE, DivF) is used as the increase-required capacities of the respective nodes, and target field 71 is divided by the proportions (d:e:f) of the communication deviations, and are reallocated to first slave 81, second slave 82, and third slave 83, respectively. As a result, the capacity of first slave 81 or the like adds the amount reallocated according to the communication deviation to the original data partition.

Then, in step S15, frame configuration section 52 reconfigures frame 62 by changing the ratio of each data partition. As a result, data field 64 in frame 62, which is used for communication of network 61, is optimized. Process command section 53 instructs the multiple nodes (first slave 81 and the like) to execute the configuration process such that first slave 81, second slave 82, and third slave 83 can transmit and receive reconfigured frame 62 (S16). After the configuration process is executed, communication control device 51 resumes communication in a fixed cycle using the reconfigured frame.

With the optimization by the reconfiguration process of frame 62 as described above, when the operation mode of component mounting machine 1 is the production mode (S11: Yes), the unused region (extra region 72) in the bandwidth (the length of frame 62) of the communication executed in a fixed cycle becomes available for the communication. When the operation mode of component mounting machine 1 is the maintenance mode (S11: No), for example, if the firmware incorporated in feeder 23 of component supply device 20 is updated, communication can be made, in which the entire region of data field 64 in the bandwidth or a region close thereto is assigned to the component supply device 20 (second slave 82).

Upon completion of the communication for updating the firmware, frame configuration section 52 reconfigures original frame 62 or frame 62 optimized according to the subsequent processes (S11-S15). Process command section 53 then instructs all the slaves (first slave 81, and the like) to execute the configuration process (S16), whereby the communication using reconfigured frame 62 becomes possible.

(1-5. Effects of Configurations of Embodiments)

In communication with multiple nodes, communication control device 51 transmits and receives frame 62 having data field 64 to which data partitions of specified capacities are assigned to the respective multiple nodes. Communication control device 51 includes frame configuration section 52 that reconfigures frame 62 by changing the ratio of each data partition in data field 64 according to the communication state of network 61 including the multiple nodes, and process command section 53 that instructs the multiple nodes to execute the configuration process such that the multiple nodes are enabled to transmit and receive reconfigured frame 62.

With such a configuration, communication control device 51 reconfigures frame 62 according to the communication state of network 61 (S15), and executes the configuration process such that communication using frame 62 is possible (S16). As a result, each of the multiple nodes transmits and receives reconfigured frame 62. Therefore, since an appropriate data partition is assigned to each node according to the communication state of network 61, it is possible to prevent a predetermined data partition from being reserved in data field 64 for a node having a low need for communication, and it is possible to secure an appropriate data partition for a node having a high need for communication. As a result, it is possible to improve communication efficiency in network 61.

In addition, frame configuration section 52 reconfigures frame 62 by changing the ratio of each data partition by setting a partial region or the entire region of the data field 64 as target field 71 and reallocating target field 71 to each of the multiple nodes. With such a configuration, communication control device 51 specifies a partial region or the entire region of data field 64 of frame 62 as target field 71 to be reallocated, and changes the ratio of each data partition by appropriately reallocating target field 71. As a result, if target field 71 is a partial region of data field 64, the data capacity corresponding to the regions other than target field 71 can be maintained. If target field 71 is the entire region of data field 64, the ratio can be changed with a higher degree of freedom.

Communication control device 51 according to the present disclosure, wherein communication control device 51 is applied to network 61 of a production device having multiple field devices as multiple nodes. In a production device (component mounting machine 1) having multiple field devices (board conveyance device 10 and the like) as multiple nodes, commands given to the field devices (board conveyance device 10 and the like) are periodically required, and the responsiveness from the field devices (board conveyance device 10 and the like) may affect production efficiency. Therefore, there is a high demand for an improvement in communication efficiency with multiple field devices, such as board conveyance device 10. In such a production device (component mounting machine 1), it is particularly useful to change the ratio of each data partition in data field 64 and to communicate using reconfigured frame 62.

Further, when reconfiguring frame 62 during the execution of production by the production device, frame configuration section 52 reconfigures frame 62 by setting the extra region excluding the data partition for each of the multiple nodes in data field 64 as target field 71, and reallocating target field 71 for each of the multiple nodes, thereby changing the ratio of each data partition.

With such a configuration, when production device (component mounting machine 1) is performing production, a method of reallocating extra region 72 is adopted among various methods for changing the ratio of each data partition. Thus, in the case of the production mode, the capacity of the data partition already allocated and assigned in frame 62 that is being currently used is maintained, and extra region 72 is reallocated to each of the multiple nodes. Therefore, the data partitions of the multiple nodes are increased by the capacity to be reallocated. In addition, the capacity required for communication by each node in production is minimally secured. As a result, extra region 72 in data field 64 can be reduced, such that the communicable data capacity can be increased and the communication efficiency can be improved.

In addition, when reconfiguring frame 62 the production device stops production and maintenance is executed, frame configuration section 52 reconfigures frame 62 by setting the entire region of data field 64 as target field 71, and reallocating target field 71 for each of the multiple nodes, thereby changing the ratio of each data partition.

With such a configuration, when the production device (component mounting machine 1) is in the process of stopping the production and executing the maintenance, a method of reallocating the entire region of data field 64 is adopted among various methods for changing the ratio of each data partition.

This allows the entire region of data field 64 to be reallocated to the multiple nodes without maintaining the data partitions already allocated and assigned in frame 62, that is being currently used. Therefore, the ratio of the data partitions of the multiple nodes is changed so as to reflect the proportion of the capacity required by each node in accordance with the communication state, for example. As a result, it is possible to minimize, for example, a data partition of a node in which communication is unnecessary while deleting a useless region (extra region) 72 in data field 64. Further, in the maintenance, the data partition is secured according to the capacity required for each node by communication control device 51. As a result, it is possible to increase the communicable data capacity and improve communication efficiency.

The production device is component mounting machine 1 for mounting electronic components on a circuit board to produce a board product. With such a configuration, the component mounting machine is required to have real-time capability in communication with each node when the mode is the production mode, and there is a high demand for improvement in communication efficiency. In the component mounting machine, at least a portion of the nodes (field device (such as component supply device 20)) incorporates updatable firmware. When the firmware is updated in the maintenance mode of the component mounting machine, an increase in the communication capacity of the node incorporating the firmware is particularly required. Thus, it is particularly useful in the component mounting machine to make communication using frame 62 reconfigured by changing the ratio of each data partition in data field 64.

In addition, frame configuration section 52 evenly reallocates target field 71 for each of multiple nodes, thereby changing the ratio of each data partition to reconfigure frame 62. With such a configuration, target field 71 that is extra region 72 or the entire region of data field 64 is evenly reallocated by the number of nodes. As a result, the data partition of each node is uniformly increased. Therefore, extra region 72 in data field 64 can be reduced, and the communication efficiency can be improved.

The communication weight in network 61 is set in advance for each of the multiple nodes. Frame configuration section 52 reallocates target field 71 based on the proportion of the communication weight for each of multiple nodes, thereby changing the ratio of each data partition to reconfigure frame 62.

With such a configuration, target field 71 that is extra region 72 or the entire region in data field 64 is reallocated at the proportion of the communication weight for each of multiple nodes. The communication weight is proportional to the amount of signals required depending on the function of the node, for example, and the communication weight is set to increase as the number of sensors or the sampling cycle, the amount of commands input to and output from the node, and the like are increased. In a case of performing reallocation at such proportions of communication weight, the ratio of data partitions can be optimized according to the needs of the communication capacity of each node, and frame 62 suitable for the communication state can be reconfigured, as compared with a case in which the data partitions are simply evenly reallocated.

Minimum data capacities (MIN1, MIN2, MIN3) required for transmitting and receiving frame 62 and maximum data capacities (MAX1, MAX2, MAX3) transmittable and receivable by one frame 62 are set in the individual multiple nodes. Frame configuration section 52 calculates communication deviations (DivD, DivE, DivF), which are differences between the maximum data capacities and the minimum data capacities, for the respective multiple nodes, and reallocates the target field based on the proportions (d:e:f) of the communication deviations for each of the multiple nodes, thereby changing the ratio of each data partition to reconfigure frame 62.

With such a configuration, target field 71 that is extra region 72 or the entire region in data field 64 is reallocated at the proportions (d:e:f) of the communication deviations, which are the differences between the maximum data capacity and the minimum data capacity for each of the multiple nodes. In the configuration of network 61, each node cannot input and output data exceeding the maximum data capacity in one cycle. Further, the communication deviations (DivD, DivE, DivF) correspond to increased amounts required from the minimum data capacities based on the amount of signals required according to the functions of the nodes. In a case of performing reallocation at communication deviation proportions (d:e:f), the proportions of the data partitions can be optimized according to the needs of the communication capacity of each node, and frame 62 suitable for the communication state can be reconfigured, as compared with a case in which the data partitions are simply evenly reallocated.

Communication control device 51 is a master that performs communication with each of multiple nodes as slaves in network 61 in a fixed cycle. With such a configuration, communication control device 51 can perform an overall control of each node as a slave according to the communication standard of the master-slave system. Each of the slaves performs communication according to the command from the master and performs the configuration process as needed. In network 61, it is particularly useful to optimize frame 62 according to the communication states.

The communication in network 61 consists of one cycle of a process in which frame 62 transmitted from the master passes through all the slaves and frame 62 transmitted back by the last slave passes through all the slaves again and is returned to the master. With such a configuration, the communication in one cycle in network 61 is executed in a fixed cycle, thereby ensuring the real-time capability in communication. In such a communication standard, since the capacity of data field 64 is limited in order to realize a predetermined frequency, it is particularly useful to optimize frame 62 by changing the proportion of each data partition in data field 64 because the bandwidth is effectively used.

When frame 62 passes through the slave, the slave reads and writes data from and to the data partition assigned to the slave itself in data field 64. With such a configuration, the slave performs I/O process on-the-fly on frame 62. With such a communication standard, it is possible to increase the frequency of communication, and it is possible to improve the real-time capability in communication. On the other hand, in such a communication standard, since the capacity of data field 64 is limited, if extra region 72 is generated by minimizing the specified capacity of the data partition in data field 64, the utilization of the bandwidth may be lowered (extra region 72 tends to increase). Therefore, it is particularly useful to optimize frame 62 by changing the ratio of each data partition in data field 64 because the bandwidth is effectively used.

2. Modifications of Embodiment (2-1. Reconfiguration Process of Frame 62)

In the embodiment, frame configuration section 52 is configured to switch setting of target field 71 between extra region 72 and the entire region of data field 64, according to the operation mode (production mode/maintenance mode) of component mounting machine 1 (S11, S12, S13). On the other hand, communication control device 51 may be configured to appropriately set target field 71 regardless of the operation mode of the production device such as component mounting machine 1, or may be configured to uniformly set target field 71 to extra region 72 or the entire region of data field 64.

In addition, communication control device 51 executes the reconfiguration process of the frame 62 when, for example, the communication state of the network 61 changes or when there is an operator's request. Alternatively, the reconfiguration process of frame 62 may be executed when the operation mode of the production device is switched or when a decrease in the communication efficiency in network 61 is detected. In addition, with respect to the "change in communication state" described above, communication control device 51 may determine that there is a "change in communication state" when the amount of change in communication capacity required for each slave exceeds a preset threshold value and may execute the reconfiguration process of frame 62.

Here, configuration process in each node requires a certain amount of time, and communication cannot be performed until the required time elapses. Therefore, even if the change in the communication state is small, if frame 62 is subject to reconfiguration process every time and the configuration process is executed, the excessive process is performed, which may lead to lowering of communication efficiency. Therefore, when the amount of change in the communication capacity required for each slave exceeds a preset threshold as described above, it is assumed that there has been a certain change in the communication state of network 61, and the ratio of each data partition is changed to reconfigure frame 62. As a result, it is possible to prevent excessive configuration processes from being executed.

Further, communication control device 51 may determine whether the execution of the configuration process is effective in terms of improving communication efficiency after frame 62 is reconfigured (S15) in the reconfiguration process of frame 62. More specifically, process command section 53 determines whether to permit the execution of the configuration process based on the time required for the configuration process and the proportional change in the communication efficiency after the execution of the configuration process.

That is, even if the communication is temporarily stopped by the execution of the configuration process, if communication efficiency is improved as a whole by the communication efficiency that has been improved after the stopping, process command section 53 determines that the execution of the configuration process is effective and instructs the multiple nodes to execute the configuration process such that the multiple nodes are enabled to transmit and receive reconfigured frame 62. On the other hand, even if the communication efficiency is improved using reconfigured frame 62, if the communication stop time is significantly affected by the execution of the configuration process, the present state is maintained without executing the configuration process. With such a configuration, it is possible to prevent excessive configuration processes from being executed.

In the reallocation process (S14) of target field 71, frame configuration section 52 divides target field 71 by any one of three dividing methods (A) to (C) and reallocates divided target fields 71 to each node. On the other hand, frame configuration section 52 can employ various dividing methods. For example, these dividing methods (A) to (C) can be switched or mixed according to the communication state. More specifically, it is conceivable to determine whether there is an increase request for each node by the dividing method (C) based on communication deviation, and to have even reallocation (A) to a node for which there is an increase request or to have reallocation (B) based on communication weight.

With the above-described configuration, a node having a communication deviation of 0 is determined to have an increase request amount from the minimum data capacity of 0, and communication capacity is no longer reallocated to the node. Instead of performing reallocation to the other nodes based on communication deviation, communication capacity is reallocated equally or based on communication weight. As a result, the communication capacity of target field 71 is reallocated to the other nodes except the node having a communication deviation of 0, which makes it possible to improve the communication efficiency.

(2-2. Communication Standard for Network 61)

In the embodiment, the communication standard applied to network 61 is Ethernet. It is assumed that communication control device 51 is a master that performs communication with a slave in a fixed cycle in network 61 in which the master-slave system is employed. On the other hand, communication control device 51 can apply various communication standards and communication methods corresponding to network 61 as long as network 61 transmits and receives a frame having data field 64 to which a data partition of a specified capacity is assigned to each of multiple nodes.

(2-3. Application of Communication Control Device 51)

In the embodiment, communication control device 51 is applied to network 61 of component mounting machine 1. The nodes with which communication control device 51 (master) communicates are board conveyance device 10 (first slave 81), component supply device 20 (second slave 82), and component transfer device 30 (third slave 83). On the other hand, communication control device 51 can be applied to any network 61 having multiple nodes.

For example, when it is necessary to reconfigure frame 62 in network 61 having four or more nodes, communication control device 51 reconfigures frame 62 by changing the ratio of each data partition for each of the four or more nodes. Specifically, when part camera 41, board camera 42, and other field devices of component mounting machine 1 are included in the same network 61, communication control device 51 treats these devices as nodes, thereby achieving the same effect as the embodiment.

Further, in the embodiment, the production device is configured to be component mounting machine 1. On the other hand, communication control device 51 can be applied to a production device other than component mounting machine 1 as long as the production device has multiple field devices as multiple nodes. More specifically, the production device may be a solder printing machine that constitutes a production line together with component mounting machine 1, or an inspection device that inspects a circuit board on which electronic components are mounted. Further, communication control device 51 can be applied to a network including the production devices described above and host computers, or a network of devices that perform various operations other than that of the production device.

REFERENCE SIGNS LIST

1: Component mounting machine
10: Board conveyance device (node, slave)
20: Component supply device (node, slave)
21: Slot
23: Feeder
30: Component transfer device (node, slave)
31: Head driving device
32: Moving table
33: Mounting head
34: Suction nozzle
41: Part camera
42: Board camera
50: Control device
51: Communication control device (master)
52: Frame configuration section
53: Process command section
61: Network
62: Frame
63: Header
64: Data field
71: Target field
72: Extra region
81: First slave
82: Second slave
83: Third slave
90: Circuit board

The invention claimed is:

1. A communication control device in communication with multiple nodes, being configured to transmit and receive a frame having a data field to which data partitions of specified capacities for the respective multiple nodes are assigned, the communication control device comprising:
processing circuitry configured to
reconfigure the frame by changing a ratio of each of the data partitions in the data field based on a communication state of a network including the multiple nodes; and
instruct the multiple nodes to execute a configuration process to enable the multiple nodes to transmit and receive the reconfigured frame,
wherein processing circuitry determines whether to permit execution of the configuration process based on a time required for the configuration process and a proportional change in communication efficiency after the execution of the configuration process.

2. The communication control device according to claim 1, wherein the processing circuitry reconfigures the frame by using a partial region or an entire region of the data field as a target field, and reallocating the target field for each of the multiple nodes to thereby change the ratio of each of the data partitions.

3. The communication control device according to claim 2, wherein the communication control device is applied to the network of a production device having multiple field devices as the multiple nodes.

4. The communication control device according to claim 3, wherein when the frame is reconfigured during execution of production by the production device, the processing circuitry reconfigures the frame by setting an extra region excluding the data partition for each of the multiple nodes in the data field as the target field, and reallocating the target field for each of the multiple nodes to change a ratio of each data partition.

5. The communication control device according to claim 3, wherein when the production device stops production and the frame is reconfigured during execution of maintenance, the processing circuitry reconfigures the frame by setting the entire region of the data field as the target field, and reallocating the target field for each of the multiple nodes to thereby change the ratio of each of the data partitions.

6. The communication control device according to claim 3, wherein the production device is a component mounting machine configured to mount an electronic component on a circuit board to produce a board product.

7. The communication control device according to claim 2, wherein
the processing circuitry reconfigures the frame by evenly reallocating the target field to each of the multiple nodes to thereby change the ratio of each of the data partitions.

8. The communication control device according to claim 2,
wherein a minimum data capacity required for transmitting and receiving the frame and a maximum data capacity, being transmittable and receivable by one frame, are set for each of the multiple nodes, and
wherein the processing circuitry reconfigures the frame by calculating a communication deviation, which is a difference between the maximum data capacity and the minimum data capacity, for each of the multiple nodes, and reallocating the target field based on the a rate of the communication deviation for each of the multiple nodes to thereby change the ratio of each of the data partitions.

9. The communication control device according to claim 1, wherein the communication control device is a master that performs communication with each of the multiple nodes as slaves in the network at a regular interval.

10. The communication control device according to claim 9, wherein the communication in the network has a process cycle in which the frame transmitted from the master passes through all the slaves and the frame transmitted back by the last one of the slaves passes through all the slaves again and is returned to the master.

11. The communication control device of claim 10, wherein, when the frame passes through each of the slaves, the slave reads and writes data from and to the data partition assigned to the slave in the data field.

12. A communication control device in communication with multiple nodes, being configured to transmit and receive a frame having a data field to which data partitions of specified capacities for the respective multiple nodes are assigned, the communication control device comprising:
processing circuitry configured to
reconfigure the frame by changing a ratio of each of the data partitions in the data field based on a communication state of a network including the multiple nodes; and
instruct the multiple nodes to execute a configuration process to enable the multiple nodes to transmit and receive a reconfigured frame,
wherein the processing circuitry reconfigures the frame by using a partial region or an entire region of the data field as a target field, and reallocating the target field for each of the multiple nodes to thereby change the ratio of each of the data partitions,
wherein communication weights are set in advance for each of the multiple nodes in the network, and
wherein the processing circuitry reconfigures the frame by reallocating the target field based on rates of the communication weights for each of the multiple nodes to thereby change the ratio of each of the data partitions.

13. A communication control device in communication with multiple nodes, being configured to transmit and receive a frame having a data field to which data partitions of specified capacities for the respective multiple nodes are assigned, the communication control device comprising:
processing circuitry configured to
reconfigure the frame by changing a ratio of each of the data partitions in the data field based on a communication state of a network including the multiple nodes, and
instruct the multiple nodes to execute a configuration process to enable the multiple nodes to transmit and receive the reconfigured frame, wherein the communication control device is a master that performs communication with each of the multiple nodes as slaves in the network at a regular interval, and
wherein, when an amount of change in communication capacity required for each of the slaves exceeds a predetermined threshold, the processing circuitry reconfigures the frame by changing the ratio of each of the data partitions in the data field based on the amount of change in the communication capacity.

* * * * *